United States Patent

Huang

[11] Patent Number: 5,954,088
[45] Date of Patent: Sep. 21, 1999

[54] BALL VALVE ADAPTED TO COUPLE WITH AN OUTPUT DRIVE SHAFT OF A VALVE CONTROL DEVICE

[75] Inventor: Michael Huang, Taichung Hsien, Taiwan

[73] Assignee: Transworld Steel Enterprise Corp., Ta-Li, Taiwan

[21] Appl. No.: 09/118,390

[22] Filed: Jul. 17, 1998

[51] Int. Cl.⁶ .............. F16K 43/00; F16K 5/06; F16K 31/122; F16K 41/04

[52] U.S. Cl. ............ 137/315; 137/454.2; 251/58; 251/152; 251/214; 251/292; 251/315.12; 251/315.13

[58] Field of Search .............. 137/15, 315, 454.2; 251/58, 214, 291, 292, 315.11, 315.12, 315.13, 148, 152

[56] References Cited

U.S. PATENT DOCUMENTS

| | | | |
|---|---|---|---|
| 3,394,632 | 7/1968 | Priese | 251/58 |
| 3,650,506 | 3/1972 | Bruton | 251/58 |
| 3,717,323 | 2/1973 | Geipel | 251/315.13 |
| 3,722,856 | 3/1973 | Koch et al. | 251/152 |
| 3,954,251 | 5/1976 | Callahan, Jr. et al. | 251/148 |
| 4,046,350 | 9/1977 | Massey et al. | 251/58 |
| 4,260,128 | 4/1981 | Tito | 251/58 |
| 4,538,790 | 9/1985 | Williams et al. | 251/214 |
| 4,633,897 | 1/1987 | Effenberger | 251/292 |
| 4,719,939 | 1/1988 | Killian | 137/315 |
| 4,887,634 | 12/1989 | Killian | 137/315 |
| 4,940,208 | 7/1990 | Kemp | 251/214 |
| 5,064,167 | 11/1991 | Dipalma | 251/315.13 |
| 5,203,370 | 4/1993 | Block et al. | 251/214 |
| 5,564,461 | 10/1996 | Raymond, Jr. et al. | 251/58 |
| 5,634,486 | 6/1997 | Hatting et al. | 251/214 |

Primary Examiner—George L. Walton
Attorney, Agent, or Firm—Townsend and Townsend and Crew LLp

[57] ABSTRACT

A ball valve includes a hollow valve body for mounting a valve ball therein. A drive transmitting stem has a proximate end coupled to the valve ball, and a distal end extending outwardly of the valve body for coupling with an output drive shaft of a valve control device. A hollow bearing housing of a single-piece construction is sleeved spacedly on the stem, and has a mounting end inserted into the valve body, and a support end for supporting securely the valve control device. An annular packing member, a tensioning member and a bearing member are mounted sealingly on the stem and are completely received in the bearing housing. As such, the ball valve can be connected directly to the valve control device through the bearing housing without the need for a connecting bracket.

3 Claims, 5 Drawing Sheets 5,954,088

1

BALL VALVE ADAPTED TO COUPLE WITH AN OUTPUT DRIVE SHAFT OF A VALVE CONTROL DEVICE

BACKGROUND OF THE INVENTION

1. Field of the Invention

This invention relates to a ball valve, more particularly to a ball valve adapted to couple with an output drive shaft of a valve control device.

2. Description of the Related Art

Referring to FIGS. 1 and 2, a conventional ball valve 10 is shown to include a valve body 11 with a fluid passage 111 to form an inlet 112 and an outlet 113 at two opposite sides thereof, and a valve ball 19 which is disposed in the passage 111 and which is rotated to control the fluid communication between the inlet 112 and the outlet 113. A hollow housing 12 is provided on the valve body 11, and has an upper mounting plate portion 122 with screw holes 123 and an upwardly extending hole 121 that is fluidly communicated with the passage 111 for surrounding an upright stem 13. The stem 13 has one end coupled to the valve ball 19 and the other end extending through the housing 12 for coupling with an output drive shaft (not shown) of a valve control device 20 via a coupler 31. A plurality of sealing rings 14,15 are press-fitted by a resilient ring 16 in the hole 121 so as to be interposed between the stem 13 and the inner peripheral wall of the housing 12 in order to prevent spilling from the valve body 11. A screw nut 18 and a bearing plate 17 are mounted rotatably on the stem 13. A connecting bracket 30 has upper and lower side walls with screw holes 33,35 so that a plurality of screws 32,34 can be engaged threadedly in the screw holes 33,21 and 35,123 to interengage the valve control device 20 and the housing 12.

Since the resilient ring 16, the bearing plate 17 and the screw nut 18 are mounted outwardly of the housing 12, the connecting bracket 30 is needed to facilitate interconnection between the ball valve 10 and the valve control device 20, thereby increasing the manufacturing cost. In addition, the ball valve 10 and the valve control device 20 are threaded respectively on the connecting bracket 30, thereby resulting in the need for a large number of screws 32,34.

SUMMARY OF THE INVENTION

The object of the present invention is to provide a ball valve which can be connected securely to a valve control device without using a connecting bracket.

According to this invention, a ball valve includes a hollow valve body for mounting a valve ball therein. A drive transmitting stem has a proximate end coupled to the valve ball, and a distal end extending outwardly of the valve body for coupling with an output drive shaft of a valve control device. A hollow bearing housing of a single-piece construction is sleeved spacedly on the stem, and has a mounting end inserted into the valve body, and a support end for supporting securely the valve control device. An annular packing member, a tensioning member and a bearing member are mounted sealingly on the stem and are completely received in the bearing housing. As such, the ball valve can be connected directly to the valve control device through the bearing housing without the need for a connecting bracket.

BRIEF DESCRIPTION OF THE DRAWINGS

Other features and advantages of the present invention will become apparent in the following detailed description of the preferred embodiment of the invention, with reference to the accompanying drawings, in which:

2

Figure 1:
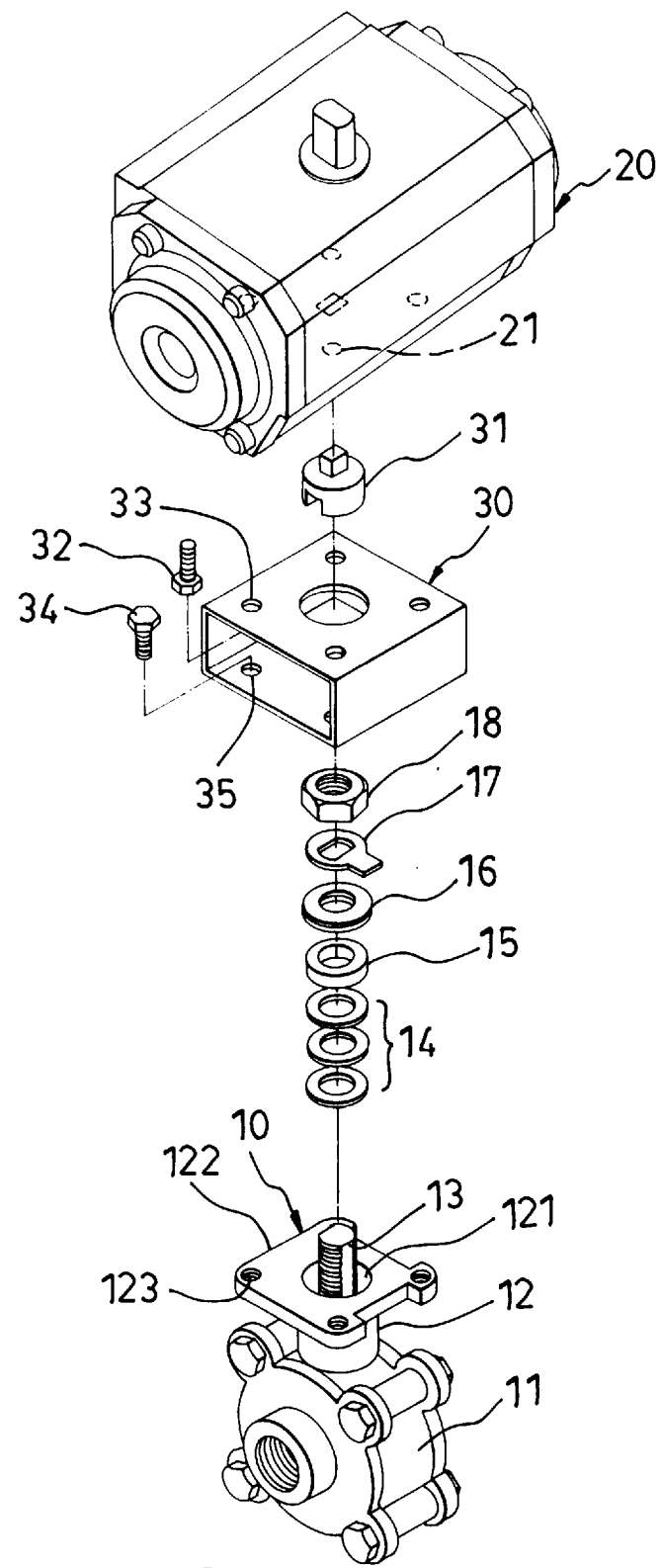
Figure 2:
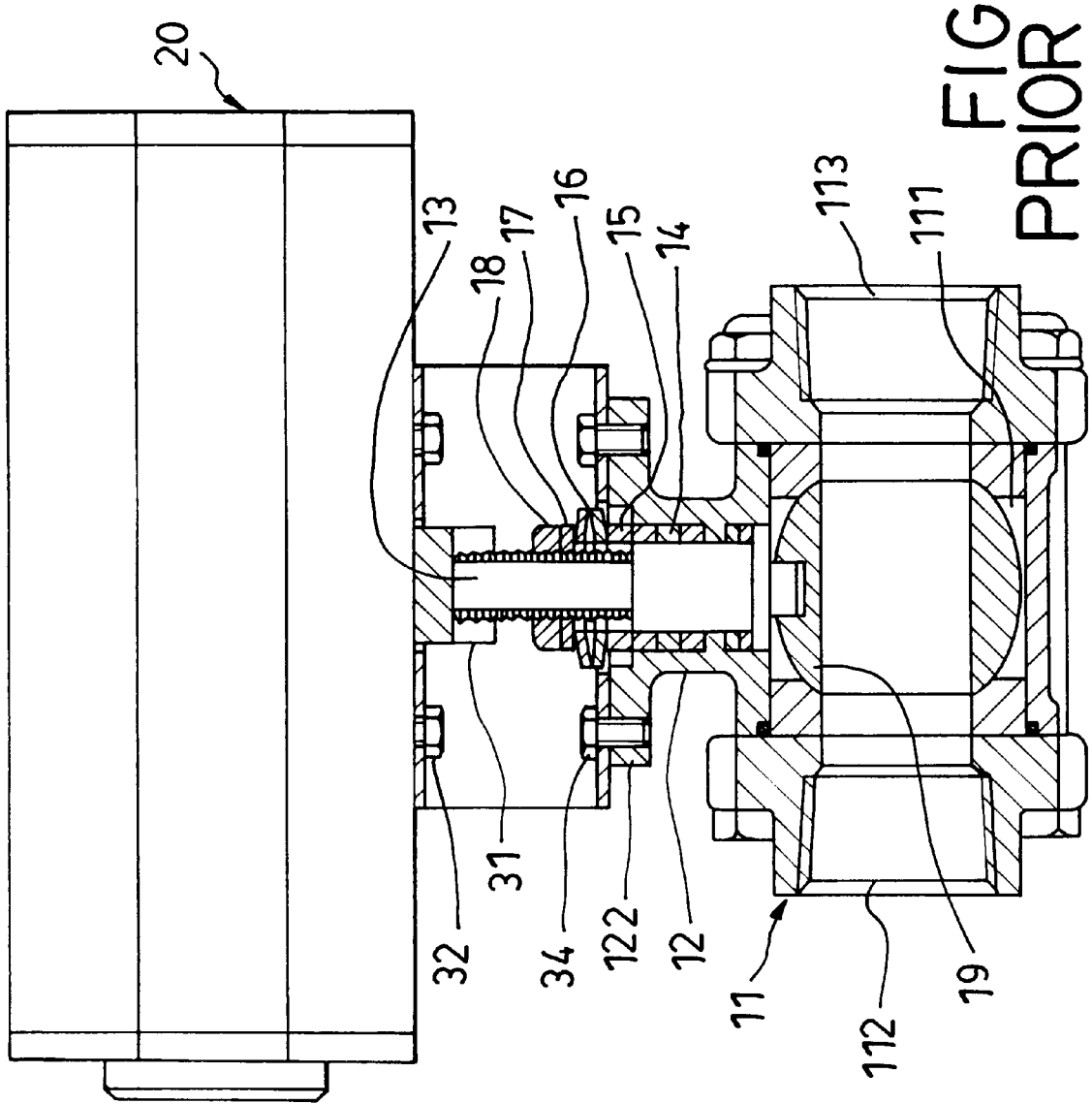
Figure 3:
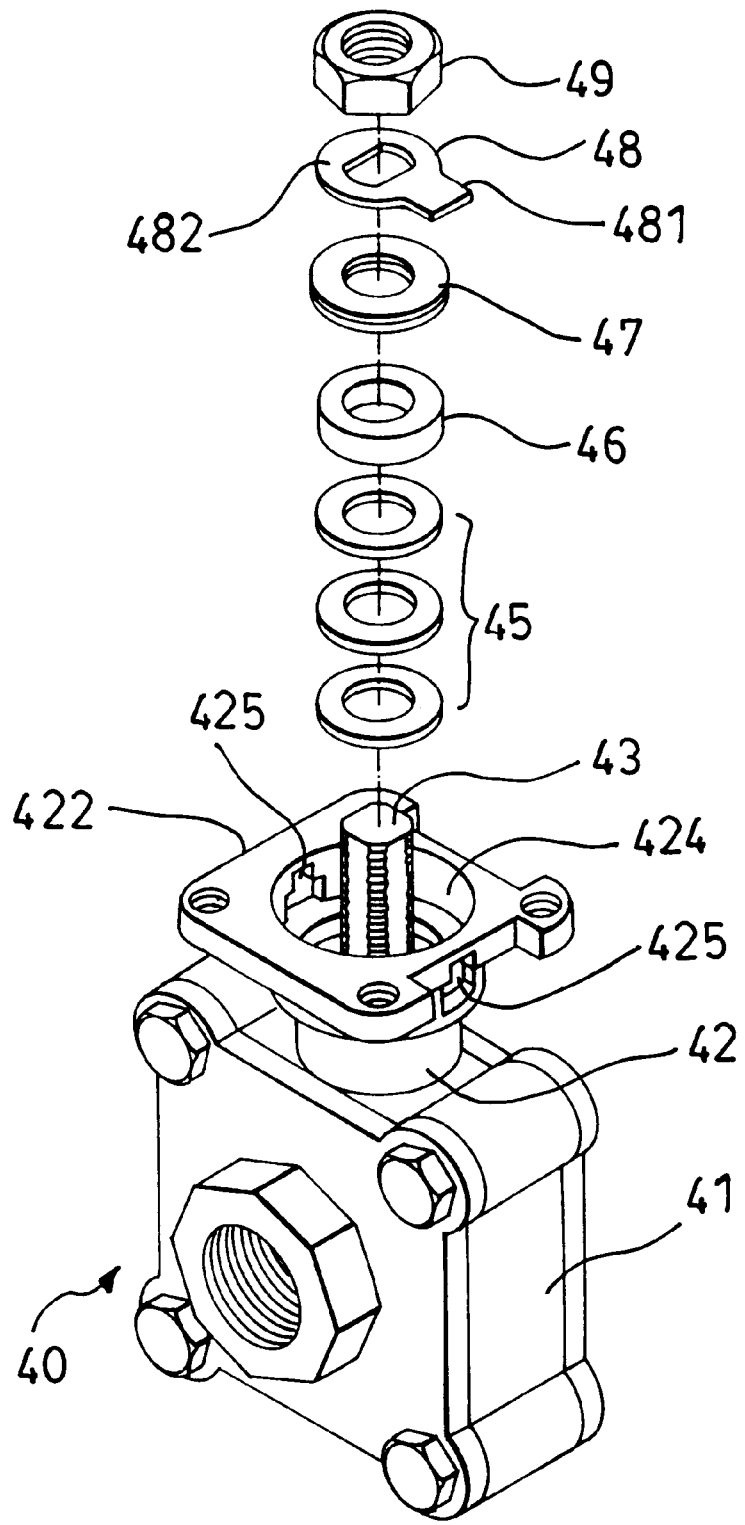
Figure 4:
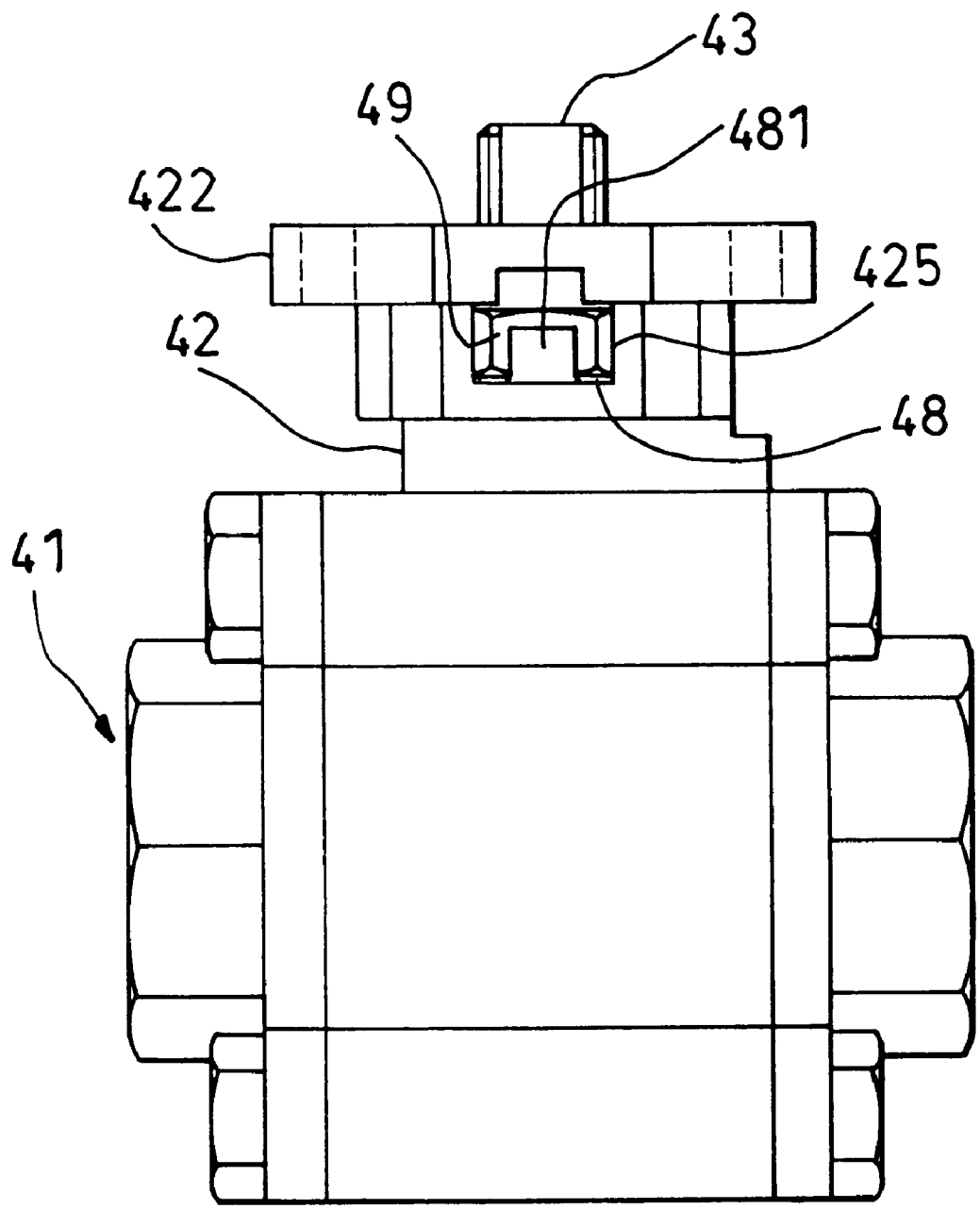

FIG. 1 is an exploded view illustrating a conventional ball valve and a valve control device;

FIG. 2 is a sectional view showing how the conventional ball valve is coupled with the valve control device;

FIG. 3 is an exploded view of a preferred embodiment of a ball valve according to this invention;

FIG. 4 is a side view of the ball valve of the preferred embodiment; and

Figure 5:
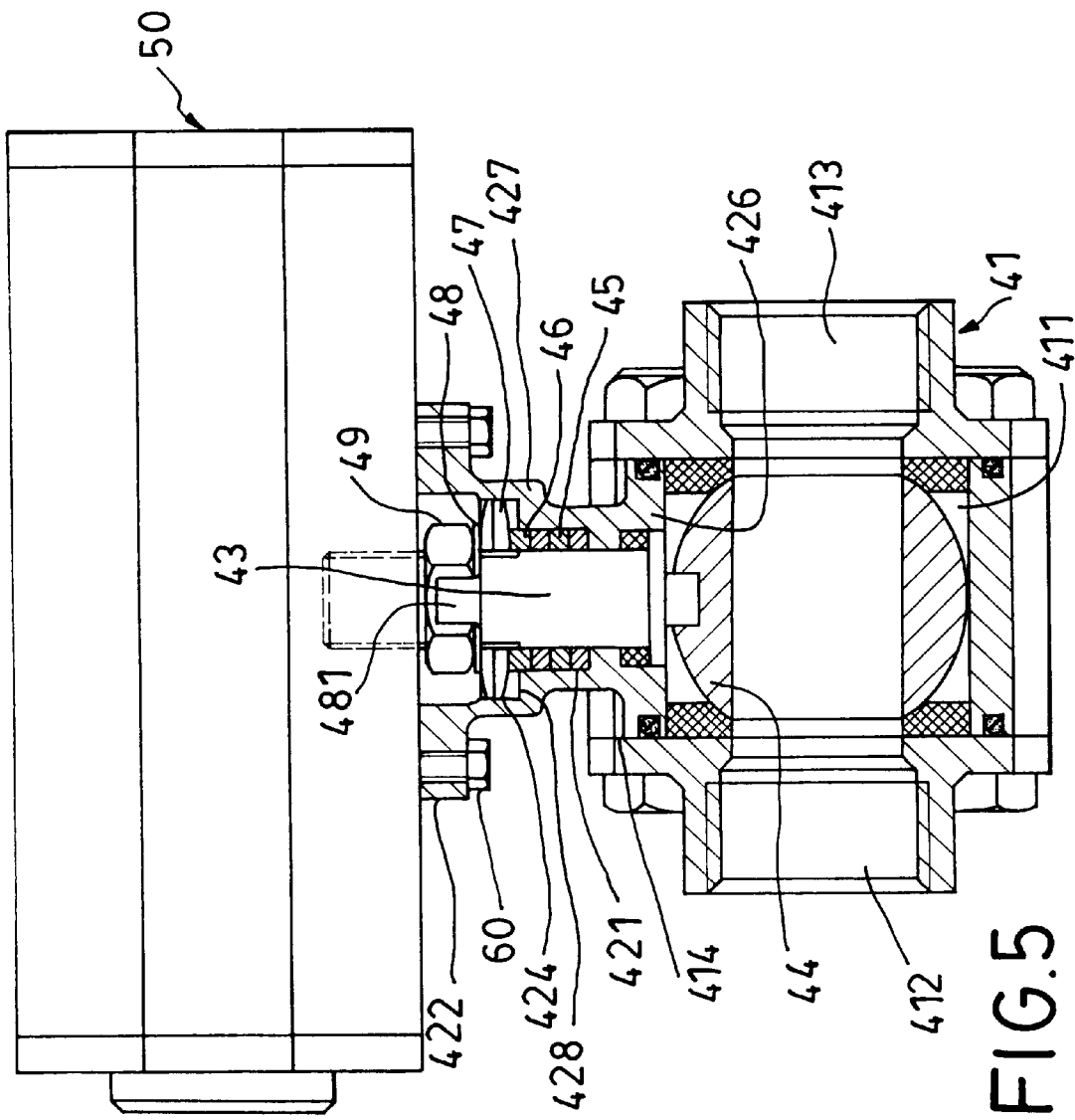

FIG. 5 is a sectional view showing how the ball valve of the preferred embodiment is coupled with the valve control device.

DETAILED DESCRIPTION OF THE PREFERRED EMBODIMENT

Referring to FIGS. 3, 4 and 5, the preferred embodiment of a ball valve 40 according to the present invention is shown to comprise a hollow valve body 41 which has a fluid passage 411 extending in a horizontal direction to form an inlet 412 and an outlet 413 at two opposite sides thereof. The valve body 41 has an annular inner wall 414 to define an insert hole extending in a radial direction relative to the horizontal direction so as to fluidly communicate with the fluid passage 411.

A valve ball 44 is disposed in the fluid passage 411 between the inlet 412 and the outlet 413, and is in sealing contact with the inner wall 414 to block the fluid communication between the insert hole and the fluid passage 411. The valve ball 44 is rotatable around an axis along the radial direction in order to control the fluid communication between the inlet 412 and the outlet 413.

A drive transmitting stem 43 has a proximate end coupled to the valve ball 44 to drive rotation of the valve ball 44, and a distal end which extends radially and outwardly of the valve body 41 through the insert hole so as to be adapted for coupling with an output drive shaft (not shown) of a valve control device 50. The stem 43 has an outer threaded portion on the distal end.

A hollow bearing housing 42 of a single-piece construction is sleeved on the stem 43. The housing 42 has a mounting end 426 which is inserted into the insert hole and which is secured peripherally to the inner wall 414 of the valve body 41 to cap the valve ball 44, a flat support end 422 adapted to be retained securely on the valve control device 50 by screw fasteners 60, and an intermediate portion 427 interposed between the mounting and support ends 422,426. The intermediate portion 427 has an inner peripheral wall opposing and spaced from the stem 43, and includes a proximate inner peripheral portion 421 located near the mounting end 426 and having a first dimension in cross section, and a distal inner peripheral portion 424 having a second dimension in cross section larger than the first dimension so as to form an annular shoulder portion 428 at the juncture of the proximate and distal inner peripheral portions 421,424. In addition, two opposite through holes 425 are formed to extend radial to the radial direction through the distal inner peripheral portion 424.

An annular packing member includes a plurality of elastomeric sealing rings 45,46 which are interposed between the stem 43 and the proximate inner peripheral portion 421, and which define a thickness in the radial direction such that the packing member extends radially and outwardly of the annular shoulder portion 428.

An annular bearing member is mounted on and is rotated with the stem 43, and includes a screw nut 49 and a restraining plate 48. The screw nut 49 is threaded on the threaded portion of the stem 43. The restraining plate 48 has a bearing body 482 and a tab 481 which extends from the bearing body 482 and which is bendable to arrest and engage an outer peripheral wall of the screw nut 49 so as to restrain rotation of the screw nut 49 relative to the stem 43.

An annular tensioning member 47 has a dimension larger than that of the sealing rings 45,46, and is interposed between the distal inner peripheral portion 424 and the stem 43. The tensioning member 47 is interposed between and biases the packing member and the bearing member inwardly and outwardly, respectively, in the radial direction when the bearing member is sliding on and is rotated relative to the packing member.

The advantages of the ball valve of this invention are as follows:

1. All of the packing member, the bearing member and the tensioning member are received in the bearing housing 42, thereby eliminating the need for a connecting bracket.

2. Engagement between the ball valve 40 and the valve control device 50 to retain directly the support end 422 on the valve control device 50 is accomplished by means of four screws 60, thereby resulting in convenient operation.

3. The through holes 425 are provided for access of a tool to bend easily the tab 481 to arrest the screw nut 49 so as to retrain loosening of the screw nut 49. In addition, the through holes 425 also provide a window for checking if spilling from the valve body 41 has occurred.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

What is claimed is:

1. A ball valve adapted for coupling with an output drive shaft of a valve control device, comprising:

a hollow valve body having a fluid passage which extends in a first direction through said valve body to form an inlet and an outlet at opposite sides thereof, and an annular inner wall defining an insert hole which extends in a radial direction relative to said first direction so as to fluidly communicate with said fluid passage between said inlet and said outlet;

a valve ball disposed in said fluid passage between said inlet and said outlet, and sealingly contacting with said annular inner wall to block fluid communication between said insert hole and said fluid passage, said valve ball being rotatable relative to said annular inner wall around an axis along the radial direction to control fluid communication between said inlet and said outlet;

a drive transmitting stem having a proximate end coupled to said valve ball to drive rotation of said valve ball, and a distal end extending radially and outwardly of said valve body through said insert hole so as to be adapted to be coupled with the output drive shaft of the valve control device;

an integrally constructed, one-piece hollow bearing housing sleeved about said drive transmitting stem, said one-piece bearing housing forming a mounting end inserted into said insert hole and peripherally secured to said annular inner wall to cap said valve ball, a support end opposite to said mounting end in the radial direction and adapted to support the valve control device, and an intermediate portion between said mounting and support ends, said intermediate portion having an inner peripheral wall opposing and spaced from said drive transmitting stem, said inner peripheral wall including a proximate inner peripheral portion at said mounting end and having a first dimension in cross section, and a distal inner peripheral portion of a second dimension in cross section, said second dimension being larger than said first dimension so as to form an annular shoulder portion at a juncture of said proximate and distal inner peripheral portions;

an annular packing member of an elastomeric material interposed between said drive transmitting stem and said proximate inner peripheral portion, and having a thickness in the radial direction such that said annular packing member extends radially and outwardly of said annular shoulder portion, an annular bearing member mounted on and rotated with said drive transmitting stem, said bearing member being disposed radially inwardly from the distal end, and being spaced from said annular packing member; and an annular tensioning member of a dimension larger than that of said annular packing member and interposed between said distal inner peripheral portion and said drive transmitting stem, said annular tensioning member being interposed between and biasing said annular packing member and said annular bearing member inwardly and outwardly, respectively, in the radial direction when said annular bearing member is sliding on and is rotated relative to said annular packing member.

2. The ball valve as claimed in claim 1, wherein said drive transmitting stem has a threaded portion, said annular bearing member including a screw nut threaded on said threaded portion, and a restraining plate having a bearing body and a tab extending from said bearing body and bendable to arrest and engage an outer peripheral wall of said screw nut so as to restrain rotation of said screw nut relative to said drive transmitting stem.

3. The ball valve as claimed in claim 2, wherein said intermediate portion of said bearing housing has a through hole extending radial to the radial direction through said distal inner peripheral portion for access of a tool to bend said tab.

* * * * *